(12) United States Patent
Watts

(10) Patent No.: US 7,504,829 B2
(45) Date of Patent: Mar. 17, 2009

(54) METHODS AND APPARATUS FOR SUBSURFACE GEOPHYSICAL EXPLORATION USING JOINT INVERSION OF STEADY-STATE AND TRANSIENT DATA

(75) Inventor: Michael D. Watts, Milan (IT)

(73) Assignee: WesternGeco L.L.C., Houston, TX (US)

( * ) Notice: Subject to any disclaimer, the term of this patent is extended or adjusted under 35 U.S.C. 154(b) by 266 days.

(21) Appl. No.: 11/563,004

(22) Filed: Nov. 23, 2006

(65) Prior Publication Data

US 2008/0094066 A1 Apr. 24, 2008

Related U.S. Application Data

(60) Provisional application No. 60/862,727, filed on Oct. 24, 2006.

(51) Int. Cl.
*G01V 3/08* (2006.01)
*G01V 3/12* (2006.01)

(52) U.S. Cl. ........................... 324/337; 324/365

(58) Field of Classification Search ......... 324/334–339, 324/344, 365; 702/7
See application file for complete search history.

(56) References Cited

U.S. PATENT DOCUMENTS

| | | | |
|---|---|---|---|
| 4,617,518 A | 10/1986 | Srnka | |
| 5,770,945 A | 6/1998 | Constable | |
| 5,883,515 A | 3/1999 | Strack | |
| 6,603,313 B1 | 8/2003 | Srnka | |
| 6,628,119 B1 | 9/2003 | Eidesmo | |
| 6,696,839 B2 | 2/2004 | Ellingsrud | |
| 6,717,411 B2 | 4/2004 | Ellingsrud | |
| 6,859,038 B2 | 2/2005 | Ellingsrud | |
| 6,864,684 B2 | 3/2005 | Ellingsrud | |
| 6,900,639 B2 | 5/2005 | Ellingsrud | |
| 6,914,433 B2 | 7/2005 | Wright et al. | |
| 7,023,213 B2 | 4/2006 | Nichols | |
| 7,026,819 B2 | 4/2006 | Eidesmo | |
| 7,038,456 B2 | 5/2006 | Ellingsrud | |
| 7,109,717 B2 | 9/2006 | Constable | |

(Continued)

FOREIGN PATENT DOCUMENTS

GB 2410090 A 7/2005

(Continued)

OTHER PUBLICATIONS

P. M. Duncan et al., "The Development And Applications Of A Wide Band Electromagnetic Sounding System Using A Pseudo-Noise Source," Geophysics, 45:1276-96 (Aug. 1980).

(Continued)

*Primary Examiner*—Jay M Patidar
(74) *Attorney, Agent, or Firm*—James Trosino; Liangang (Mark) Ye; Jeffrey E. Griffin

(57) ABSTRACT

Methods and apparatus are provided for controlled source electromagnetic surveying. In particular, a time-varying electromagnetic signal is transmitted at a first location, and an electromagnetic signal responsive to the transmitted signal is received at a second location, wherein the received signal includes a transient response component and a steady-state component. The received signal is continuously recorded during a predetermined time interval, and data corresponding to the transient response component and the steady-state component are extracted from the received signal. The transient response data and the steady-state response data are jointly inverted to identify a subsurface feature, such as resistivity.

46 Claims, 14 Drawing Sheets

U.S. PATENT DOCUMENTS

| | | |
|---|---|---|
| 7,116,108 B2 | 10/2006 | Constable |
| 7,356,411 B1 * | 4/2008 | Stoyer et al. ............... 702/2 |
| 2006/0186887 A1 | 8/2006 | Strack et al. |
| 2006/0217889 A1 | 9/2006 | Burtz |

FOREIGN PATENT DOCUMENTS

| | | |
|---|---|---|
| WO | WO 2006026361 | 9/2006 |

OTHER PUBLICATIONS

A. P. Raiche et al., "The Joint Use OfCoincident Loop Transient Electromagnetic And Schlumberger Sounding To Resolve Layered Structures," Geophysics 50:1618-1627 (Oct. 1985).

Alan D. Chave et al., "Electrical Exploration Methods For The Seafloor," in Electromagnetic Methods In Applied Geophysics, vol. 2, M. Nabighian ed., Society of Exploration Geophysicists (1991).

Kurang Mehta et al., "Controlled Source Electromagnetic (CSEM) Technique For Detection And Delineation Of Hydrocarbon Reservoirs: An Evaluation," SEG/Houston Technical Program, Society of Exploration Geophysicists (Nov. 8, 2005).

Brian R. Spies et al., "Electromagnetic Sounding," Chapter 5 in Electromagnetic Methods in Applied Geophysics: Application (Investigations in Geophysics, No. 3), edited by Misac Nabighian, pp. 285 and 294-299 (Dec. 1991).

International Search Report dated Oct. 17, 2008 for PCT/US2007/081370.

Gomez-Trevino et al, Electromagnetic Soundings in the Sedimentary Basin of Southern Ontario- A Case History Geophysics, USA, vol. 48, No. 3, Mar. 1983.

* cited by examiner

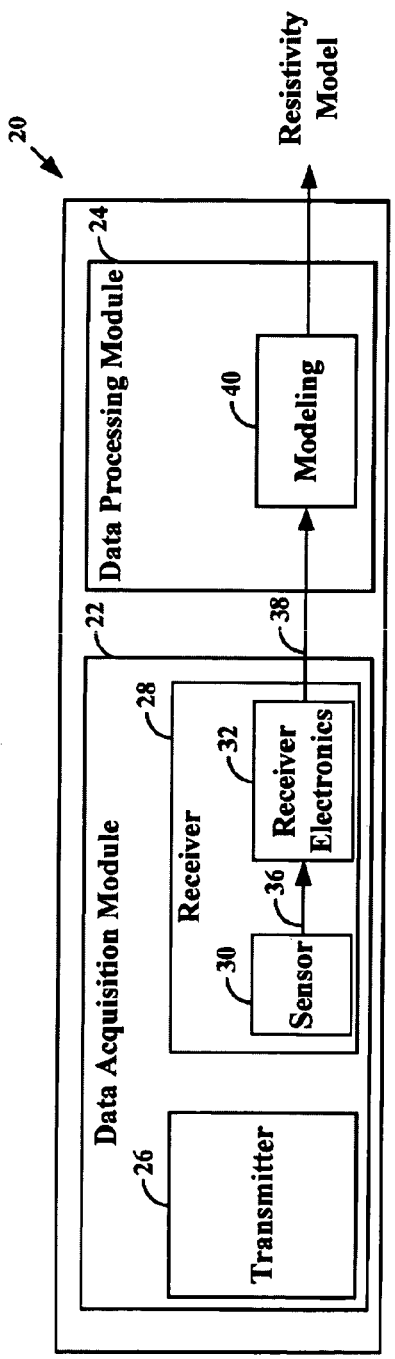
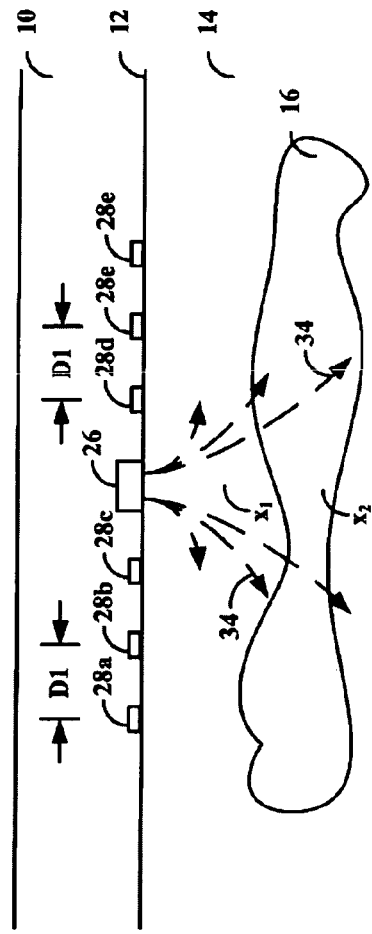
FIG. 2 (PRIOR ART)
FIG. 3 (PRIOR ART)

METHODS AND APPARATUS FOR SUBSURFACE GEOPHYSICAL EXPLORATION USING JOINT INVERSION OF STEADY-STATE AND TRANSIENT DATA

REFERENCE TO RELATED APPLICATION

This application claims the benefit of U.S. Provisional Patent Application Ser. No. 60/862,727, filed 24 Oct. 2006, which is incorporated by reference herein in its entirety.

BACKGROUND

The invention pertains to controlled-source electromagnetic surveying. In particular, this invention pertains to methods and apparatus for acquiring and processing controlled source electromagnetic survey data to identify subsurface features, such as hydrocarbon reserves and other similar subsurface features, that may be characterized in terms of subsurface resistivity data.

For many years, various techniques have been used to identify and monitor hydrocarbon reserves (e.g., petroleum and natural gas) located beneath the earth, both on land and underwater. For example, FIG. 1 illustrates a simplified cross-sectional view of a portion of the earth located below a body of water 10, such as an ocean. Beneath the ocean floor 12 there may be one or more layers of sediment 14, with an oil reservoir 16 buried deep within the sediment 14. The electrical resistivity r1 of sea water 10 is typically much less than the resistivity r2 of sediment 14, which in turn is typically much less than the resistivity r3 of oil reservoir 16. Thus, one way to distinguish between the various subsurface geophysical features involves measuring the electrical resistivity at various subsurface depths, and then using the measured data to create an "image" of the subsurface features. Because the various geophysical features may be located very far below the earth's surface or the sea floor, it is impractical to drill into the earth to directly measure the resistivity of each feature. As a result, various techniques have been developed for measuring the resistivity of subsurface features using equipment located at or above the earth's surface.

One commonly used technique to perform such measurements is called controlled source electromagnetic ("CSEM") surveying. For example, FIGS. 2 and 3 illustrate a previously known CSEM surveying system 20 that includes a data acquisition module 22 and data processing module 24. Data acquisition module 22 includes one or more transmitters 26 and one or more receivers 28. Each receiver 28 includes a sensor 30, such as a dipole antenna, and a receiver electronics module 32. Receivers 28 may be arranged in a specific configuration relative to transmitter 26. For example, as shown in FIG. 3, receivers 28 may be disposed in a linear array on either side of transmitter 26, with a predetermined spacing D1 between adjacent receivers 28.

Transmitter 26 transmits an electromagnetic signal 34 (e.g., an electric current or magnetic field) into the earth below ocean floor 12, and the sensor 30 in each receiver 28 measures a corresponding received signal 36 (e.g., a voltage and/or magnetic field). Each receiver electronics module 32 includes circuitry used to filter, amplify, and convert received signals 36 to digital data 38 that may be stored for subsequent data processing. Data processing module 24 includes modeling module 40 which uses digital data 38 from receivers 28 to generate a model that may be used to estimate resistivities at various locations (e.g., $x_1$ and $x_2$) in the vicinity of transmitter 26 and receivers 28.

FIG. 4A illustrates an exemplary transmitted signal 34, which may be a bipolar square wave current signal having a peak magnitude $I_1$, and a 50% duty cycle. FIG. 4B illustrates an exemplary received signal 36, which may be a voltage signal that includes a transient component 42 and a steady-state (or quasi-steady-state) component 44. Transient component 42 has a magnitude that typically is much smaller than the magnitude of steady-state component 44. For example, transient component 42 may have a magnitude on the order of about $10^{-10}$ volts, whereas steady state component 44 may have a magnitude on the order of about 1 volt.

Although transient data and steady-state data each may be used to estimate resistivities of subsurface structures, prior art CSEM systems typically generate resistivity models using only one data type. Indeed, because receiver electronics modules 32 in prior art CSEM systems typically have limited dynamic range and bandwidth, such systems generally are incapable of detecting both transient component 42 and steady-state component 44 of received signals 36. Thus, many prior art CSEM systems effectively "discard" data that might otherwise be used to generate models of subsurface features.

Further, although some researchers have developed models that incorporate both transient data and steady-state data, such as the system described in A. P. Raiche et al., "The Joint Use Of Coincident Loop Transient Electromagnetic And Schlumberger Sounding To Resolve Layered Structures," Geophysics 50:1618-1627 (October 1985), such studies typically have used two separate data acquisition systems—a first system that acquires transient data, and a second system that acquires steady state data. Such "dual data" systems are more costly to use than systems that include a single data acquisition system. In particular, prior art dual data systems require configuration, calibration and maintenance of two separate sets of electronics equipment. Further, the time required to perform data collection operations using separate data acquisition systems typically is longer than the time required to gather data using a single data acquisition system. The costs associated with the additional measurement time can be prohibitively expensive, particularly for underwater exploration. In addition to the extra equipment and operational costs associated with prior art dual data CSEM systems, such systems typically have been used for relatively simple, one-dimensional resistivity models, and have only been used to process on-shore data.

It therefore would be desirable to provide methods and apparatus for controlled source electromagnetic surveying that use a single acquisition system to acquire both transient and steady state data either on-shore or off-shore, and jointly process the data to develop one-dimensional, two-dimensional or three-dimensional models of subsurface geophysical structures.

SUMMARY

This invention provides methods and apparatus for controlled source electromagnetic surveying. In particular, this invention provides systems and methods that include transmitting a time-varying electromagnetic signal at a first location, receiving an electromagnetic signal responsive to the transmitted signal at a second location, wherein the received signal includes a transient response component and a steady-state component, continuously recording the received signal during a predetermined time interval, extracting data corresponding to the transient response component and the steady-state component from the received signal, and jointly inverting the transient response data and the steady-state response data to identify a subsurface feature.

The transmitted electromagnetic signal may include an electric current, a magnetic field, or other similar electromagnetic signal, and may include a square-wave, a commutated bipolar square-wave, an encoded sequence, such as a pseudorandom binary or ternary sequence, or other similar signal. The transmitted electromagnetic signal may be transmitted using a dipole antenna, such a grounded electric dipole antenna, or an inductive source, such as a wire loop, or other similar transmitter or combination of such transmitters.

The received electromagnetic signal may include a voltage, a current, a magnetic field or other similar electromagnetic signal. The received electromagnetic signal may be received by a dipole antenna, such a grounded electric dipole antenna, or an inductive source, such as a wire loop, or other similar receiver or combination of such receivers.

The first and second locations may be on shore or under water. The identified subsurface feature may include a resistivity, a conductivity or other similar feature.

BRIEF DESCRIPTION OF THE DRAWINGS

Features of the present invention can be more clearly understood from the following detailed description considered in conjunction with the following drawings, in which the same reference numerals denote the same elements throughout, and in which:

FIG. 2 is an exemplary previously known controlled source electromagnetic surveying system;

FIG. 3 is an exemplary implementation of portions of the system of FIG. 2;

DETAILED DESCRIPTION

Figure 1:
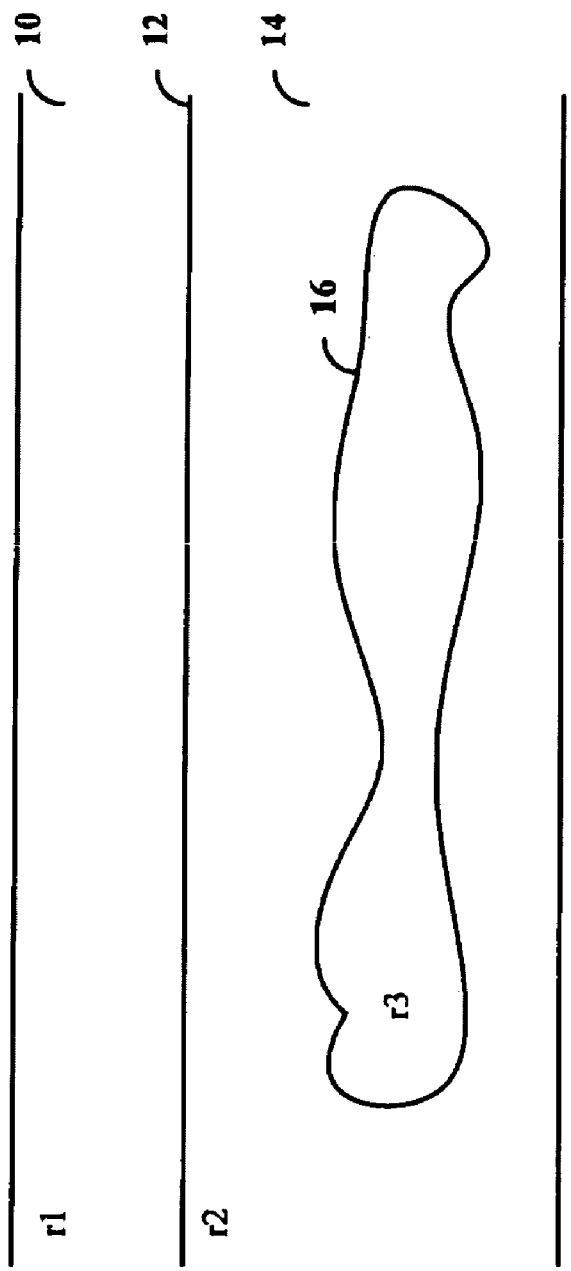
FIG. 1 is a simplified cross-sectional view of a portion of earth.
Figure 4A:
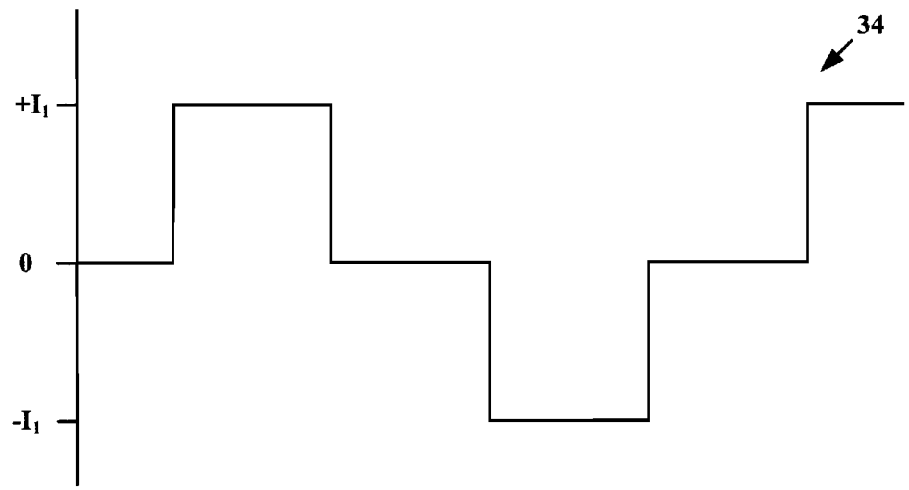
FIGS. 4A and 4B are exemplary transmitted and received signals in controlled source electromagnetic surveying systems.
Figure 4B:
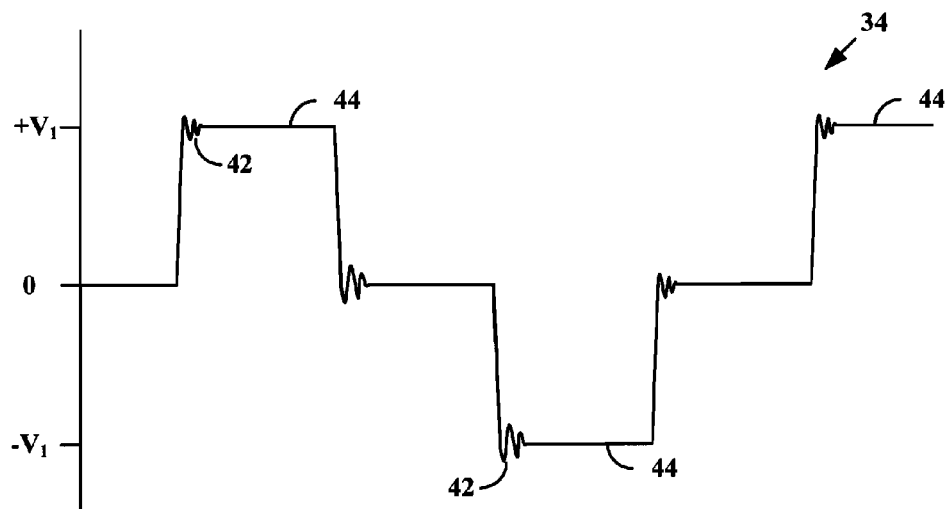
Figure 5:
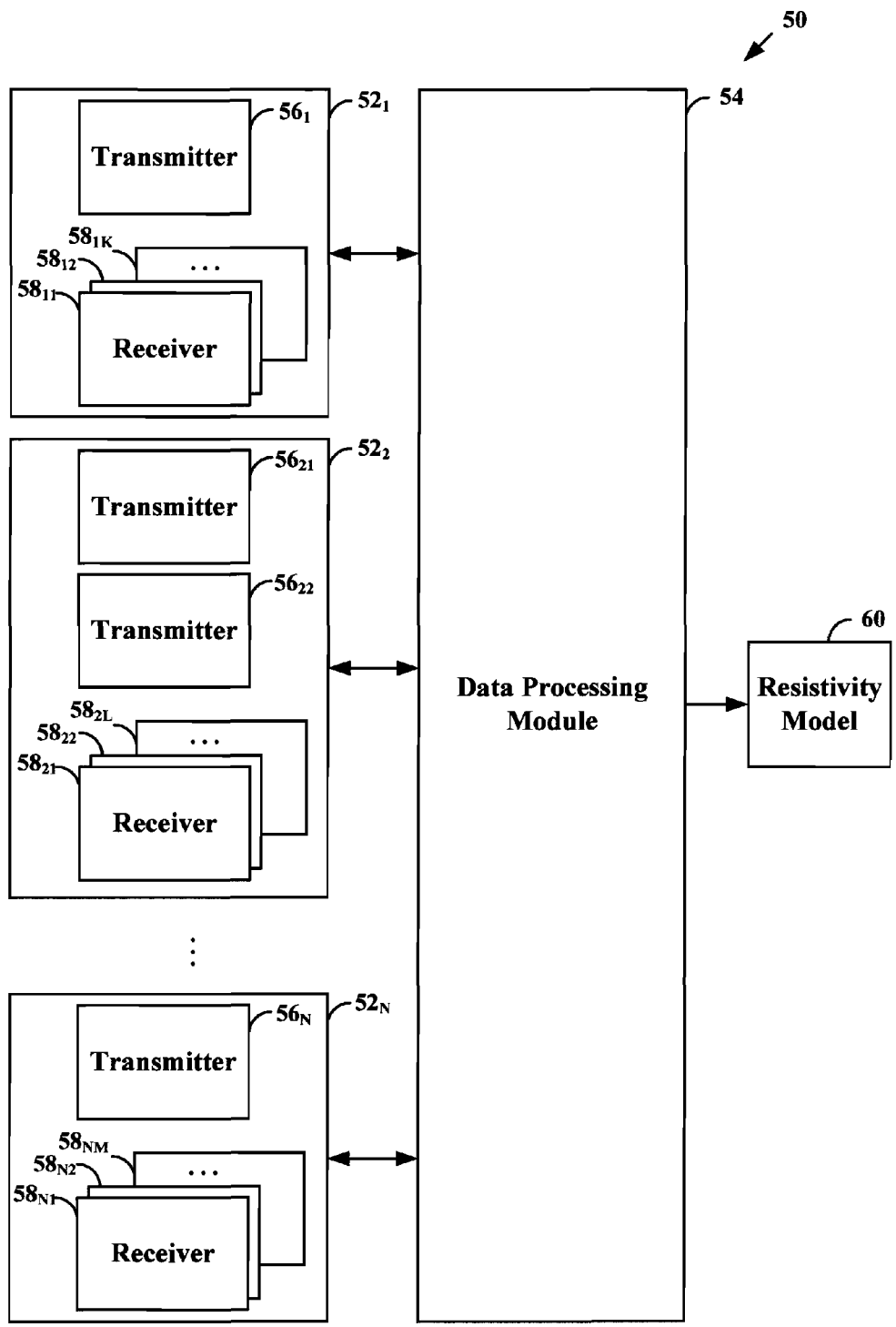
FIG. 5 is an exemplary embodiment of a controlled source electromagnetic surveying system in accordance with this invention.

Referring now to FIG. 5, an exemplary embodiment of a CSEM system in accordance with this invention is described. CSEM system 50 includes one or more transceiver modules $52_1, 52_2, \ldots 52_N$ coupled to a data processing module 54. Each transceiver module 52 includes one or more transmitters 56 and one or more receivers 58, some or all of which may be included in a single device, or in separate devices. For example, transceiver module $52_1$ includes transmitter $56_1$ and receivers $58_{11}, 58_{12}, \ldots, 58_{1K}$, transceiver module $52_2$ includes transmitters $56_{21}$ and $56_{21}$, and receivers $58_{21}, 58_{22}, \ldots 58_{2L}$, and transceiver module $52_N$ includes transmitter $56_N$ and receivers $58_{N1}, 58_{N2}, \ldots 58_{NM}$.

As described in more detail below, data processing module 54 retrieves transmitter data and receiver data from transceiver modules 52, and then processes the data to generate a model of a subsurface feature, such as resistivity model 60. For simplicity, unless otherwise stated, the remaining discussion describes an exemplary CSEM system 50 that includes a single transceiver module 52 having one transmitter 56 and one receiver 58. Persons of ordinary skill in the art will understand that the principles described apply equally well to systems that include multiple transceiver modules 52, with each transceiver module 52 including one or more transmitters 56 and one or more receivers 58.

Figure 6:
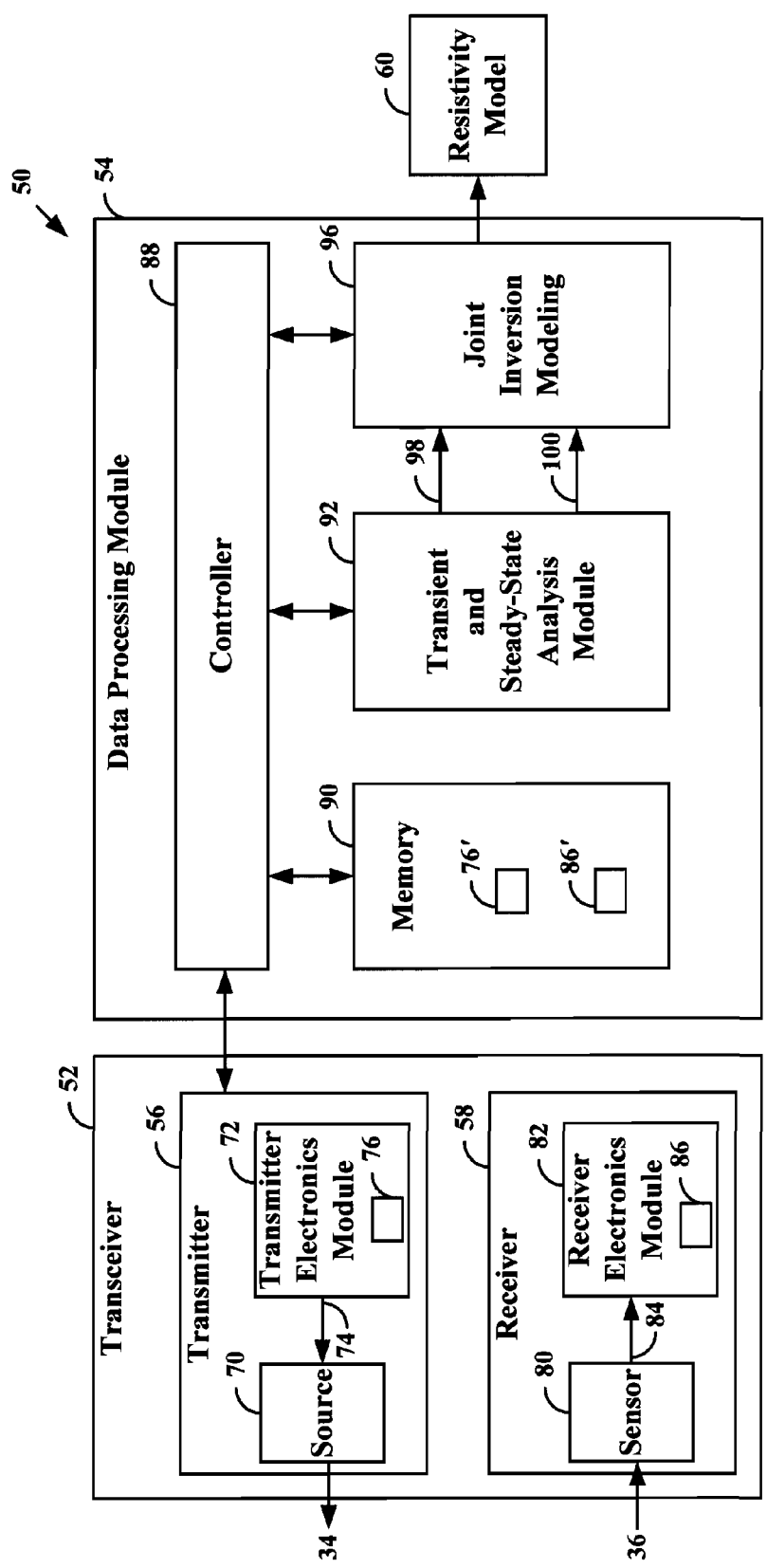
FIG. 6 is a more detailed block diagram of the exemplary controlled source electromagnetic surveying system of FIG. 5.

Referring now to FIG. 6, a more detailed exemplary embodiment of CSEM system 50 is described. Transmitter 56 includes a source device 70 coupled to a transmitter electronics module 72. Source device 70 and transmitter electronics module 72 may be included in a single device, or may be included in separate devices. Source device 70 may be a dipole antenna, such as a grounded electric dipole antenna, a magnetic loop source, or other similar source device or combination of such devices used to transmit an electromagnetic signal 34 (e.g., an electric current, a magnetic field or other similar electromagnetic signal) used for CSEM surveying. Transmitter electronics module 72, described in more detail below, includes electronic circuitry that provides a drive signal 74 to source device 70 to generate transmitted signal 34, and continuously measures and records the transmitted signal 34 for a first predetermined time interval. The recorded transmitter data 76 may be retrieved for subsequent processing by data processing module 54.

Receiver 58 includes a sensor 80 coupled to a receiver electronics module 82. Sensor 80 and receiver electronics module 82 may be included in a single device, or may be included in separate devices. Sensor 80 may be a dipole antenna, such as a grounded electric dipole antenna, a magnetic field sensor, or other similar source device or combination of such devices used to receive electromagnetic signals 36 (e.g., magnetic fields or other similar electromagnetic signals) that result when source device 70 transmits electromagnetic signals 34 into the earth. The received electromagnetic signals 36 cause sensor 80 to generate an output signal 84 (e.g., an electric current). Receiver electronics module 82, described in more detail below, includes electronic circuits that continuously measure and record sensor output signal 84 for a second predetermined time interval. The first and second time intervals may be the same time interval or may be different time intervals. The recorded receiver data 86 may be retrieved for subsequent processing by data processing module 54.

Data processing module 54 includes controller 88, memory 90, transient and steady-state analysis module 92 and joint inversion modeling module 96. Controller 88 may be a computer processor, such as a microprocessor, microcontroller, personal computer, personal digital assistant, or other similar processor. Controller 88 may include a single computer processor, or may include multiple computer processors. Memory 90 may be a hard disk, floppy disk, optical disk, flash memory, random access memory, or other similar memory device. As described in more detail below, controller 90 retrieves recorded transmitter data 76 and receiver data 86, respectively, from transmitter 56 and receiver 58, respectively, and stores a working copy of the retrieved data in memory 90 as transmitter data 76' and receiver data 86'. Transient and steady-state analysis module 92 then processes transmitter data 76' and receiver data 86' to generate transient response data 98 and steady-state response data 100. Joint inversion modeling module 96 processes transient response data 98 and steady-state response data 100 to generate a model that may be used to estimate subsurface feature information, such as resistivity model 60.

Figure 7:
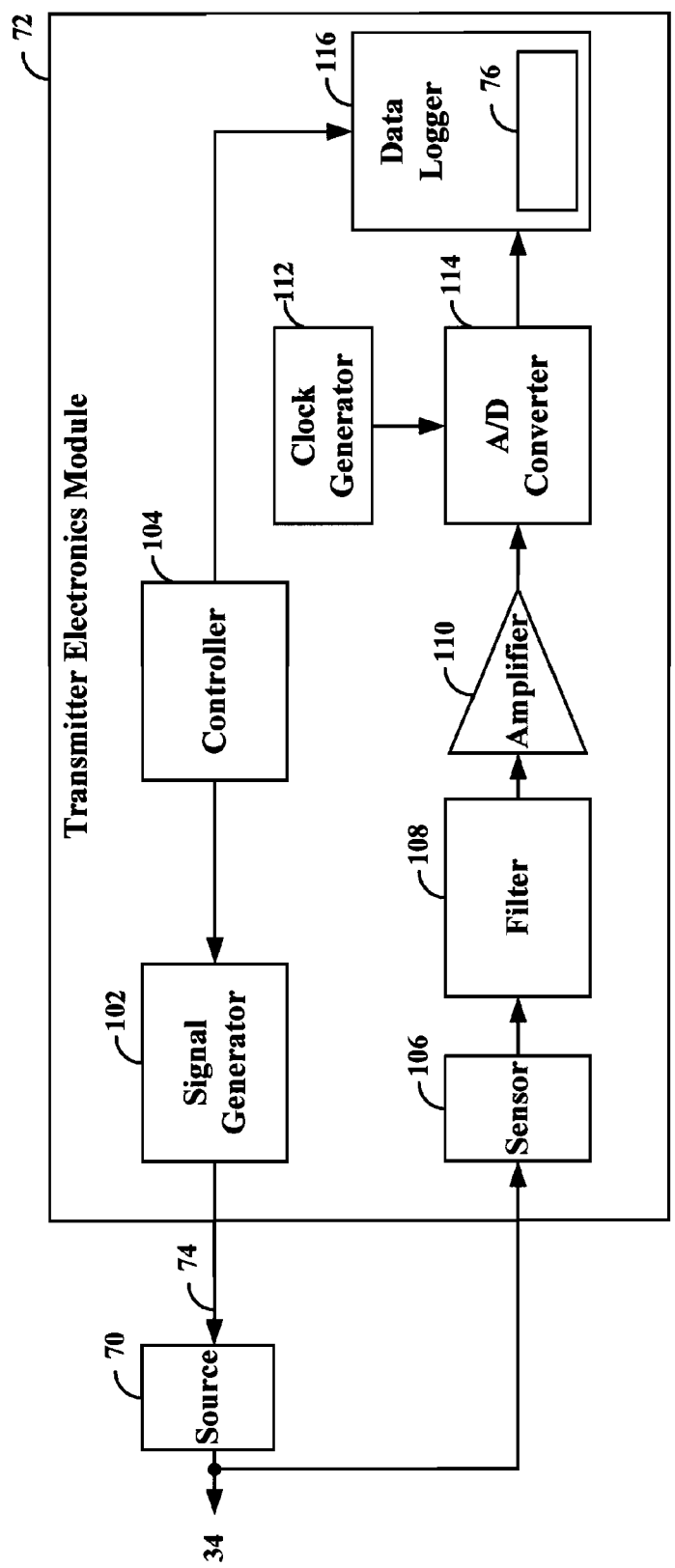
FIG. 7 is an exemplary embodiment of a transmitter electronics module of a controlled source electromagnetic surveying system in accordance with this invention.

Referring now to FIG. 7, an exemplary transmitter electronics module 72 is described. Transmitter electronics module 72 includes signal generator 102, controller 104, sensor 106, filter 108, amplifier 110, clock generator 112, analog-to-digital ("A/D") converter 114 and data logger 116, some or all of which may be included in a single device, or may be included in separate devices. Signal generator 102 may be any conventional signal generator that may be used to generate output signals 74 used to drive source 70. For example, signal generator 102 may be a programmable signal generator, such as a model MAX038C signal generator from Maxim Integrated Products, Inc., Sunnyvale, Calif., USA, that may be used to produce output signals 74 having various signal characteristics, such as signal shapes, amplitudes, frequencies and other similar signal characteristics. Output signal may be a square-wave, a commutated bipolar square-wave, an encoded sequence, such as a pseudorandom binary or ternary sequence, or other similar signal. Controller 104 may be a processor, such as a microprocessor, microcontroller, personal computer, personal digital assistant, or other similar processor, that may be used to program and control signal generator 102 and data logger 116. Persons of ordinary skill in the art will understand that signal generator 102 and controller 104 may be separate devices, or may be included in a single device.

Sensor 106 is used to detect the transmitted signal 34 at source 70. For example, if the transmitted signal 34 is an electric current, sensor 106 may be a current meter that measures the output current of source 70. Filter 108 has an input coupled to the output of sensor 106, and an output coupled to an input of amplifier 110. Filter 108 is used to suppress unwanted signals, such as power line noise, typically at harmonics of 50 or 60 Hz. Amplifier 110 amplifies the filtered output signal, and provides the amplified output signal as an input A/D converter 114. A/D converter 114 samples and converts the input signal to a corresponding digital signal. Clock generator 112 controls the sampling and conversion rate of A/D converter 114.

Data logger 116 is a device used to receive the digital output data samples provided by A/D converter 114, and continuously record the data in computer memory (such as a compact flash memory or other similar computer memory) as recorded transmitter data 76. For example, data logger 116 may be a FLU-2635A/805/901 data logger manufactured by Fluke Corporation of Everett, Wash., USA, or other similar data logger. Controller 104 may be used to control the operation of data logger 116. For example, controller 104 may generate control signals that instruct data logger 116 to clear its memory, to start and stop data collection, to collect data for the first predetermined time interval, and perform other similar operations. As described in more detail below, recorded transmitter data 76 may be extracted from data logger 116 for processing by data processing module 54.

Figure 8:
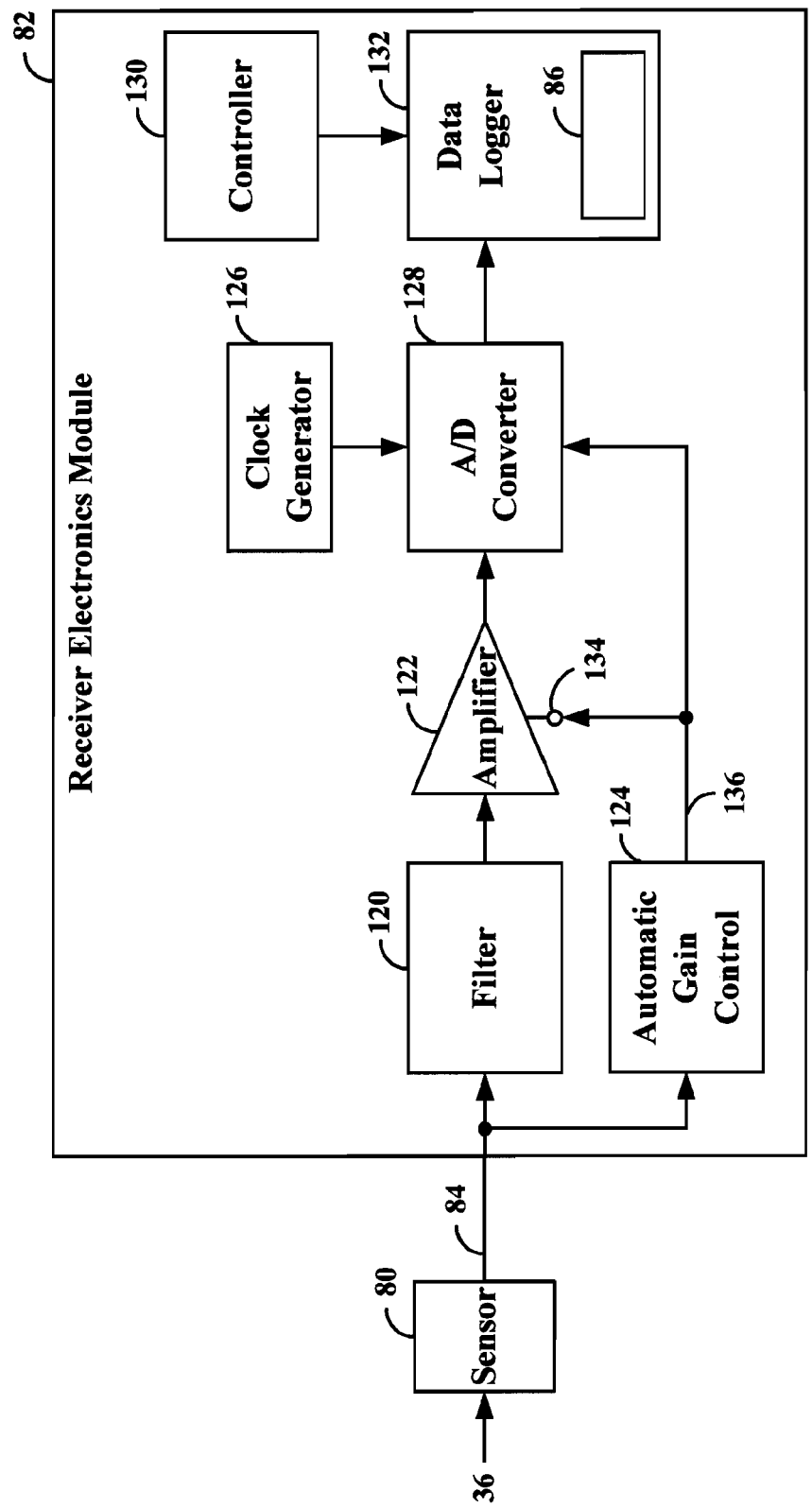
FIG. 8 is an exemplary embodiment of a receiver electronics module of a controlled source electromagnetic surveying system in accordance with this invention.

Referring now to FIG. 8, an exemplary receiver electronics module 82 is described. Receiver electronics module 82 includes filter 120, amplifier 122, automatic gain control ("AGC") circuit 124, clock generator 126, A/D converter 128, controller 130 and data logger 132, some or all of which may be included in a single device, or may be included in separate devices. Sensor output signal 84 is coupled to an input of filter 120 and an input of AGC circuit 124. Filter 120 suppresses unwanted signals, such as power line noise, typically at harmonics of 50 or 60 Hz, that may be present in sensor output signal 84. Filter 120 may be realized with a low-noise amplifier, such as an AD8671 amplifier manufactured by Analog Devices, Inc. of Norwood, Mass., USA, with Sallen-Key stages, or with an integrated universal active filter, such as a UAF42AP filter manufactured by Texas Instruments Inc., of Dallas, Tex., USA, or other similar filter. The output of filter 120 is coupled to an input of amplifier 122.

Sensor output signal 84 may have signal amplitudes that vary over a range from about 0 to about 10 volts peak-to-peak ("Vpp"). To accommodate such a wide signal range, amplifier 122 is a variable-gain amplifier having a gain that may be varied from 0 dB to about 80 dB. In particular, amplifier 122 has a control signal input node 134 that may be used to control the gain of the amplifier. AGC circuit 124 generates an output signal 136 that is proportional to the magnitude of sensor output signal 84. AGC output signal 136 is coupled to the control signal input node 134 of amplifier 122, and thus may be used to control the gain of amplifier 122 based on the magnitude of sensor output signal 84. For example, AGC output signal 136 may be used to maintain the output of amplifier 122 at about 10 Vpp.

Amplifier 122 provides an amplified output signal that is coupled to an input of A/D converter 128, which has a reference voltage input coupled to the output 124 of AGC circuit 124. A/D converter 128 may be a model AD1555/AD1556 converter manufactured by Analog Devices, or may be some other similar A/D converter. A/D converter 128 samples the output of amplifier 122 and converts the sampled signal to a corresponding digital signal. Clock generator 126 controls the sampling and conversion rate of A/D converter 128. Data logger 132 receives the digital output data samples provided by A/D converter 128, and continuously records the data in computer memory. Data logger 132 may be a FLU-2635A/805/901 data logger, or other similar data logger. Controller 130 may be a processor, such as a microprocessor, microcontroller, personal computer, personal digital assistant, or other similar processor, that may be used to control the operation of data logger 132. For example, controller 130 may generate control signals that instruct data logger 132 to clear its memory, to start and stop data collection, to collect data for the second predetermined time interval, and perform other similar operations.

Referring again to FIG. 6, controller 88 retrieves recorded transmitter data 76 and receiver data 86 from transmitter electronics module 72 and receiver electronics module 82, respectively, and stores a working copy of the retrieved data in memory 90 as transmitter data 76' and receiver data 86'. Under the direction of controller 88, transient and steady-state analysis module 92 processes transmitter data 76' and receiver data 86' to generate transient response data 98 and steady-state response data 98. In particular, transient and steady-state analysis module 92 may be implemented in a computer software program that may run on controller 88. In this regard, controller 88 may include clusters of multiple computer processors operating in parallel.

Figure 9:
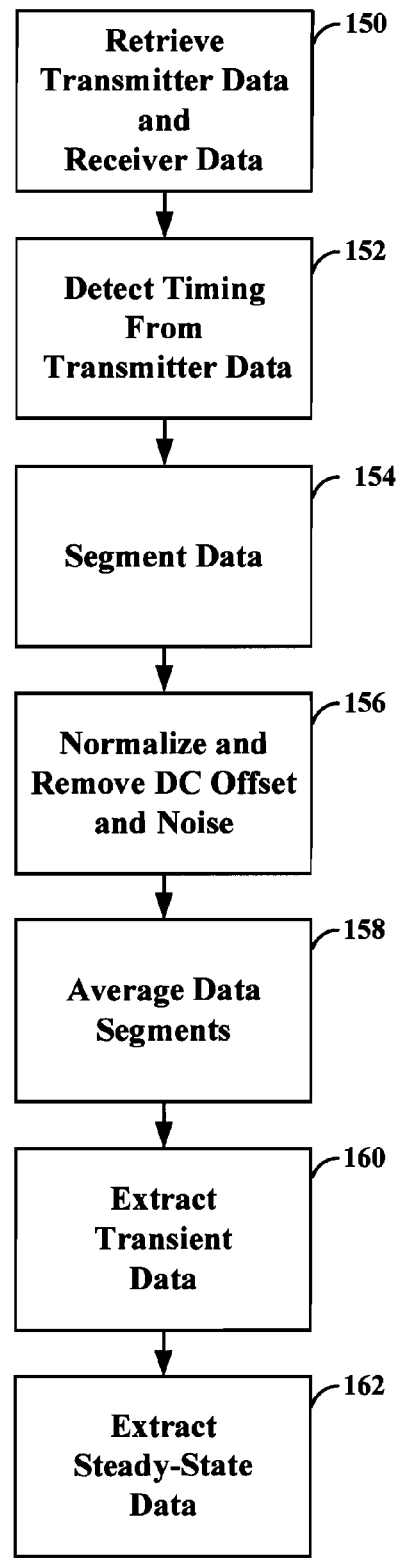
FIG. 9 is an exemplary transient data and steady-state data extraction process in accordance with this invention.
Figure 10A:
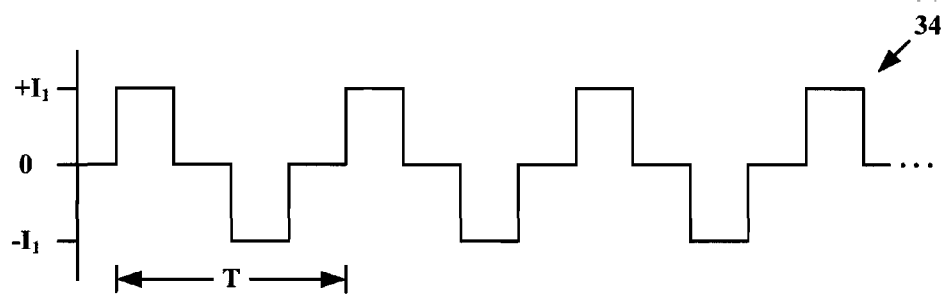
FIG. 10A illustrates an exemplary transmitted signal for use with controlled source electromagnetic surveying systems in accordance with this invention.
Figure 10B:
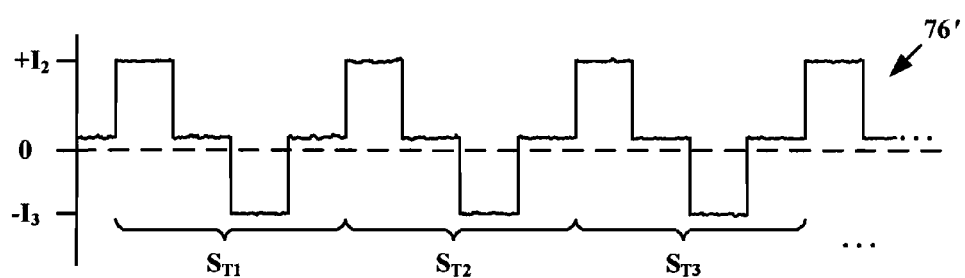
FIG. 10B illustrates exemplary transmitted data provided by controlled source electromagnetic surveying systems in accordance with this invention.
Figure 10C:
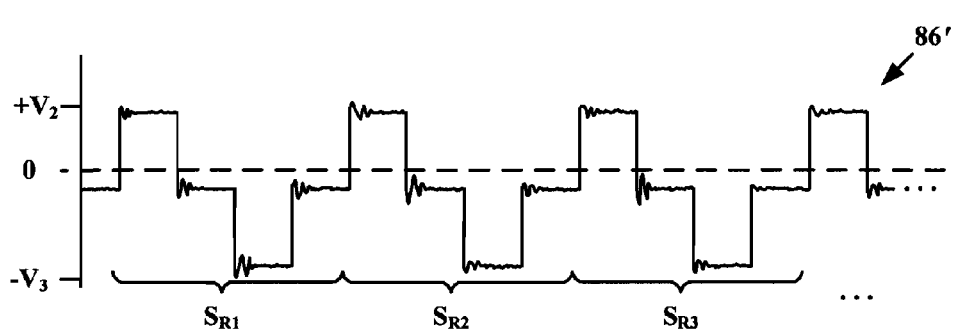
FIG. 10C illustrates exemplary receiver data provided by controlled source electromagnetic surveying systems in accordance with this invention.

Referring now to FIGS. 6 and 9, an exemplary process implemented by transient and steady-state analysis module 92 is described. Beginning at step 150, transmitter data 76' and receiver data 86' are retrieved from memory 90. FIGS. 10A-10C illustrate an exemplary transmitted signal 34, and corresponding transmitter data 76' and receiver data 86', respectively. Exemplary transmitted signal 34 is a commutated bipolar square-wave signal that varies between $+I_1$ and $-I_1$, and has a period T. Corresponding transmitter data 76' is a signal that varies between $+I_2$ and $-I_3$, and corresponding receiver data 86' is a signal that varies between $+V_2$ and $-V_3$.

Figure 10D:
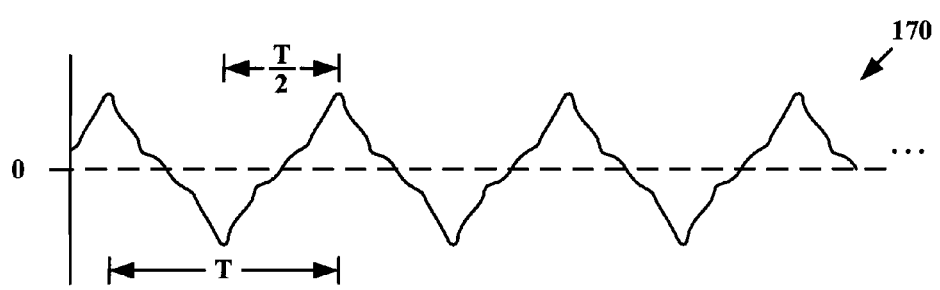
FIG. 10D illustrates an exemplary timing signal provided by controlled source electromagnetic surveying systems in accordance with this invention.

Referring again to FIG. 9, at step 152, the retrieved data are processed to extract timing information that may be used to synchronize transmitter data 76' and receiver data 86'. For example, transmitter data 76' may be cross-correlated with samples of an ideal transmitted signal (not shown) to generate a cross-correlated output signal that may be used to detect edges (e.g., transitions from OFF to ON, or from negative to positive polarity, or other similar transitions) in transmitter data 76'. FIG. 10D illustrates an exemplary cross-correlated output signal 170 having positive and negative peaks that correspond to OFF-to-positive-polarity, and OFF-to-negative-polarity transitions, respectively, on transmitter data 76'. The locations of the positive and negative peaks can then be used to align the transmitter data 76' and receiver data 86'. Persons of ordinary skill in the art will understand that other techniques also may be used to synchronize transmitter data 76' and receiver data 86'.

Figure 11:
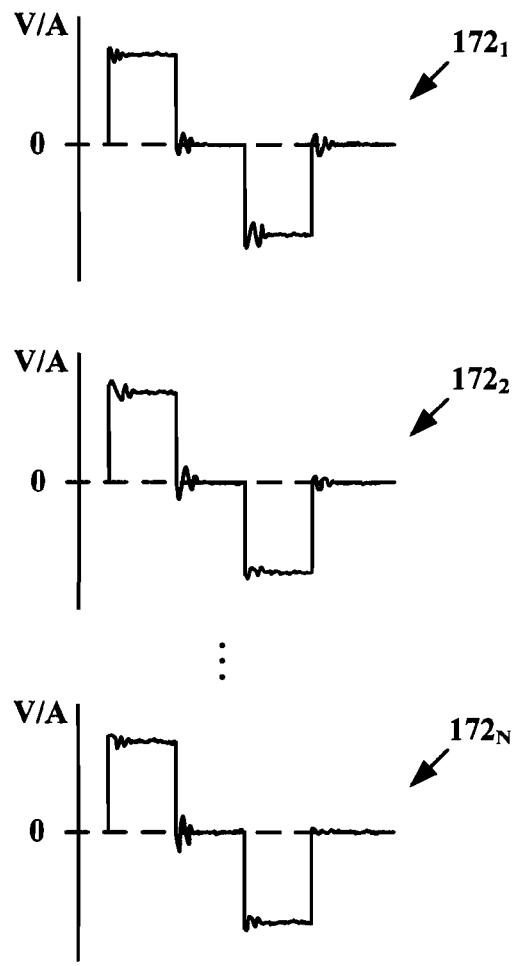
FIG. 11 illustrates exemplary segmented receiver data provided by controlled source electromagnetic surveying systems in accordance with this invention.

Referring again to FIG. 9, at step 154, transmitter data 76' and receiver data 86' are segmented based on the timing signal detected in step 152. Each segment may have a duration equal to integer multiples of the period T of transmitted signal 34. For example, as shown in FIG. 10B, transmitter data 76' may be segmented into segments $S_{T1}$, $S_{T2}$, $S_{T3}$, ..., and receiver data 86' may be segmented into corresponding segments $S_{R1}$, $S_{R2}$, $S_{R3}$, ..., with each segment including data samples for one period T. Referring again to FIG. 9, at step 156, each receiver data 86' segment is normalized by the corresponding transmitter data 76' segment, and the normalized data segments may also be processed to remove DC offset, isolated spikes, power line noise, natural electromagnetic field variations, or other unwanted components of the data. FIG. 11 illustrates N exemplary receiver data segments $172_1$, $172_2$, ..., $172_N$ following such normalization and noise-and offset removal processes.

Figure 12:
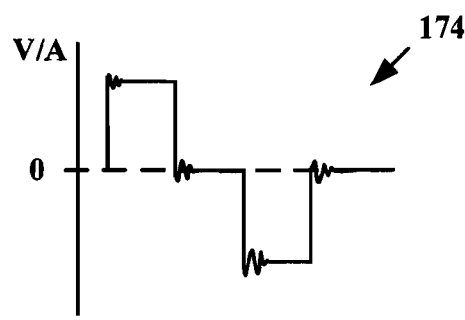
FIG. 12 illustrates an exemplary estimated receiver data pulse provided by controlled source electromagnetic surveying systems in accordance with this invention.

Referring again to FIG. 9, at step 158, the N processed receiver data segments $172_1$, $172_2$, ..., $172_N$ are averaged to generate an estimate 174 of a received data pulse over one segment. This step may be implemented using simple averaging techniques, or may be performed using more robust averaging processes, such as techniques that assume that the mean substantially equals the true value of the received data pulse, techniques that weight individual data samples by their statistical significance, techniques that identify and discard data outliers, or other similar averaging techniques. FIG. 12 illustrates exemplary estimated receiver data pulse 174 resulting from averaging receiver data segments $172_1$, $172_2$, ..., $172_N$ from FIG. 11.

Figure 13:
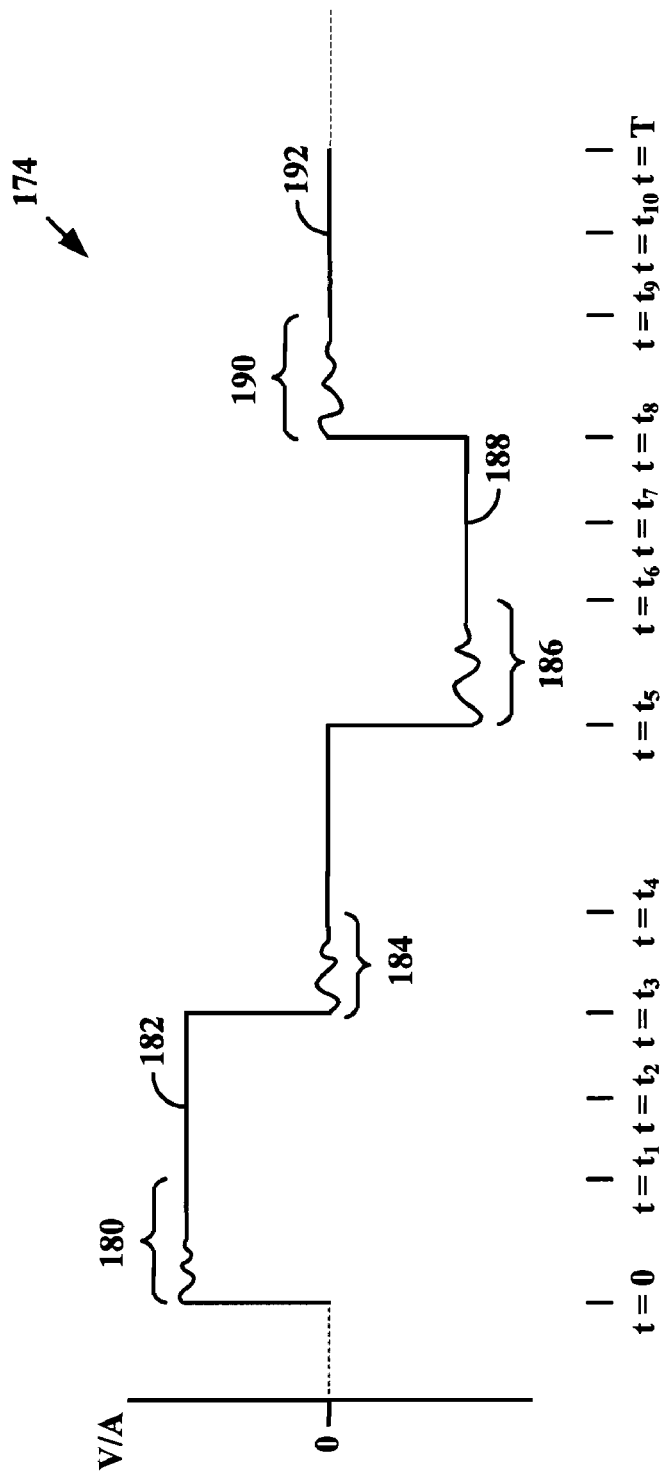
FIG. 13 illustrates an enlarged view of the exemplary receiver data pulse of FIG. 12.

Referring now to FIG. 13, an enlarged version of the exemplary estimated receiver data pulse 174 of FIG. 12 is described. Estimated receiver data pulse 174 includes data samples extending over one segment, normalized from t=0 to t=T. In addition, estimated receiver data pulse 174 includes four sub-segments: a positive polarity pulse extending from t=0 to t=$t_3$, a first OFF interval extending from t=$t_3$ to t=$t_5$, a negative polarity pulse extending from t=$t_5$ to t=$t_8$, and a second OFF interval extending from t=$t_8$ to t=T. The positive and negative polarity pulses each include a transient component and a steady-state component, whereas the first and second OFF intervals each include a transient component. Each transient component has signal values that decay to substantially zero, whereas each steady-state component has a substantially constant value.

In particular, the first sub-segment includes a transient component 180 extending from t=0 to about t=$t_1$, and a steady-state component 182 from about t=$t_1$ to t=$t_3$. The second sub-segment includes a transient component 184 extending from t=$t_3$ to about t=$t_4$. The third sub-segment includes a transient component 186 extending from t=$t_5$ to about t=$t_6$, and a steady-state component 188 extending from about t=$t_6$ to t=$t_8$. The fourth sub-segment includes a transient component 190 extending from t=$t_8$ to about t=$t_9$.

Figure 14:
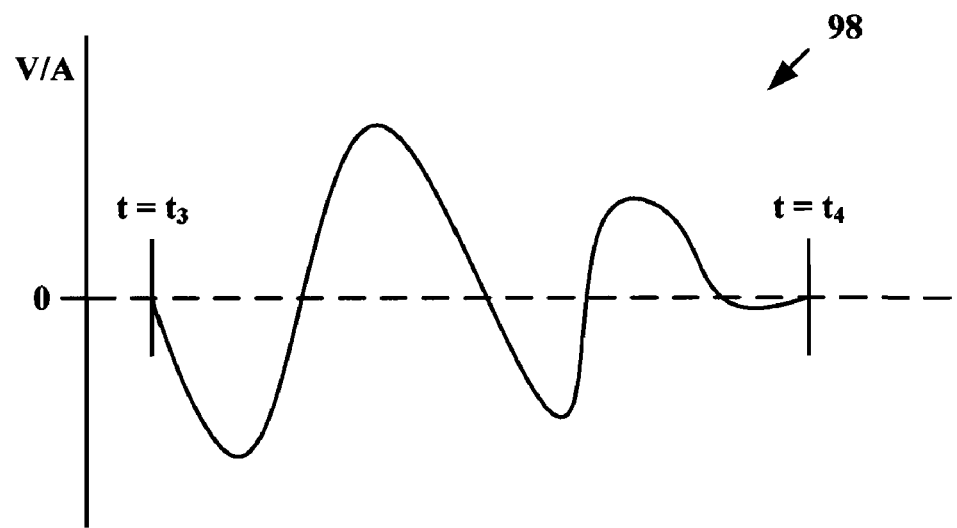
FIG. 14 illustrates an enlarged view of an exemplary transient component of the exemplary receiver data pulse of FIG. 13.

Referring again to FIG. 9, at step 160, transient component data 98 are extracted from the estimated receiver data pulse 174. In particular, as seen in FIG. 13, because the second and fourth sub-segments each include only transient components 184 and 190, respectively, data samples corresponding to either component may be extracted from estimated receiver data pulse 174 to provide transient component data 98. For example, FIG. 14 illustrates an enlarged image of transient component 184, which may be extracted from estimated receiver data pulse 174 to provide transient data 98. Referring again to FIG. 9, at step 162, steady-state data 100 are extracted from the estimated receiver data pulse 174. In particular, as seen in FIG. 13, either of steady-state data values 182 or 188 may be extracted from the first or third components, respectively, of estimated receiver data pulse 174 to provide steady-state data 100.

Referring again to FIG. 6, joint inversion modeling module 96 receives transient response data values 98 and steady-state response data values 100 from transient and steady-state analysis module 96, and processes the received data values to generate a model that may be used to estimate subsurface feature information, such as resistivity model 60. Joint inversion modeling module 96 may be implemented in a computer software program that may run on controller 88 or some other processor.

Figure 15:
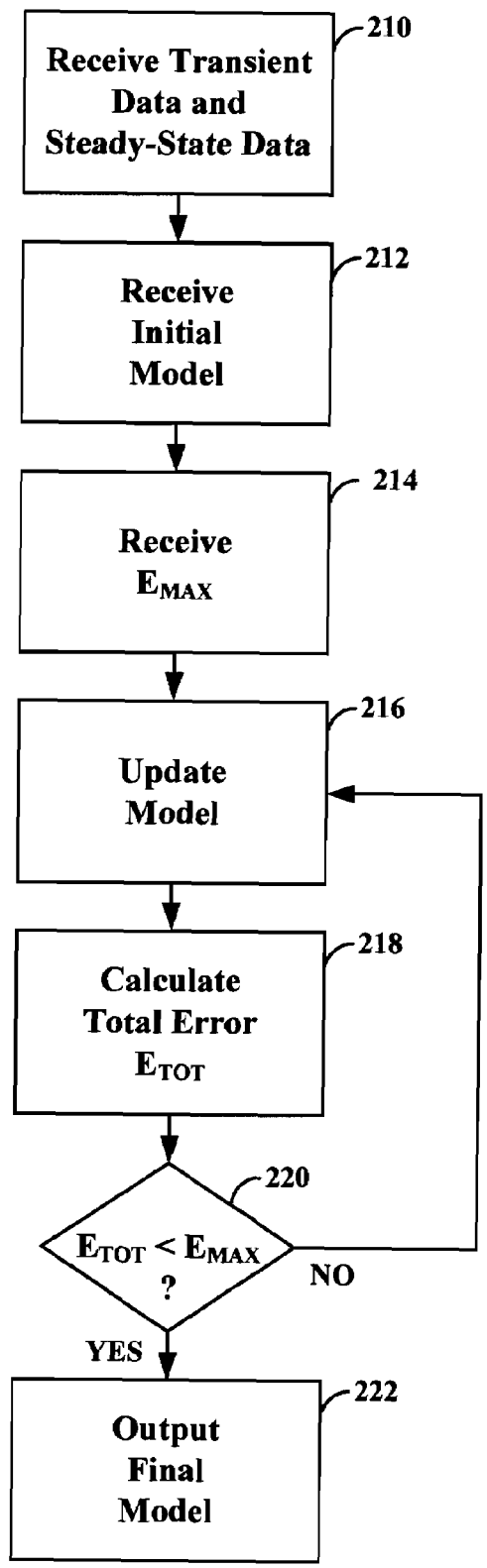
FIG. 15 illustrates an exemplary joint inversion process in accordance with this invention.

Referring now to FIGS. 6 and 15, an exemplary joint inversion modeling process is described. Beginning at step 210, transient response data values 98 and steady-state response data values 100 are received from transient and steady-state analysis module 96. Next, at step 212, an initial model is received. For example, controller 88 may include a user interface (not shown) that may be used to receive specifications of the initial model from a user. The user interface may allow the user to specify the initial model as a one-dimensional, two-dimensional, or three-dimensional model of subsurface features of the earth. The user may specify the initial model based on previously obtained geological information about the region in which the transient data values 98 and steady-state data values 100 were collected.

Next, at step 214, a maximum error value $E_{MAX}$ is received. For example, the user interface may allow a user to specify $E_{MAX}$, which may be considered as a quality measure that is used to determine how closely the estimated joint inversion model matches the measured transient response data values 98 and steady-state response data values 100. At step 216, the initial model is updated based on the transient response data values 98 and steady-state response data values 100. In particular, the model parameters are updated, and simulated transient response data values 98' and simulated steady-state response data values 100' are calculated. The simulated transient response data values 98' and simulated steady-state response data values 100' are compared with transient response data values 98 and steady-state response data values 100, respectively, and a total error value $E_{TOT}$ is calculated. For example, $E_{TOT}$ may be a total mean-square error value, or other similar error value.

Next, at step 220, the total error value $E_{TOT}$ is compared with the maximum error value $E_{MAX}$. If $E_{TOT}$ is less than $E_{MAX}$, the current model parameters are provided as resistivity model 60. If, however, $E_{TOT}$ is greater than or equal to $E_{MAX}$, the process returns to step 216, and the model is updated to attempt to reduce $E_{TOT}$. This process continues in an iterative manner until $E_{TOT}$ is less than $E_{MAX}$. Although not shown in FIG. 15, a maximum number of iterations may be specified, and the process may terminate if the maximum number of iterations has been performed. In this manner, the process may be terminated if no model may be determined that satisfies the specified maximum error value $E_{MAX}$.

Figure 16:
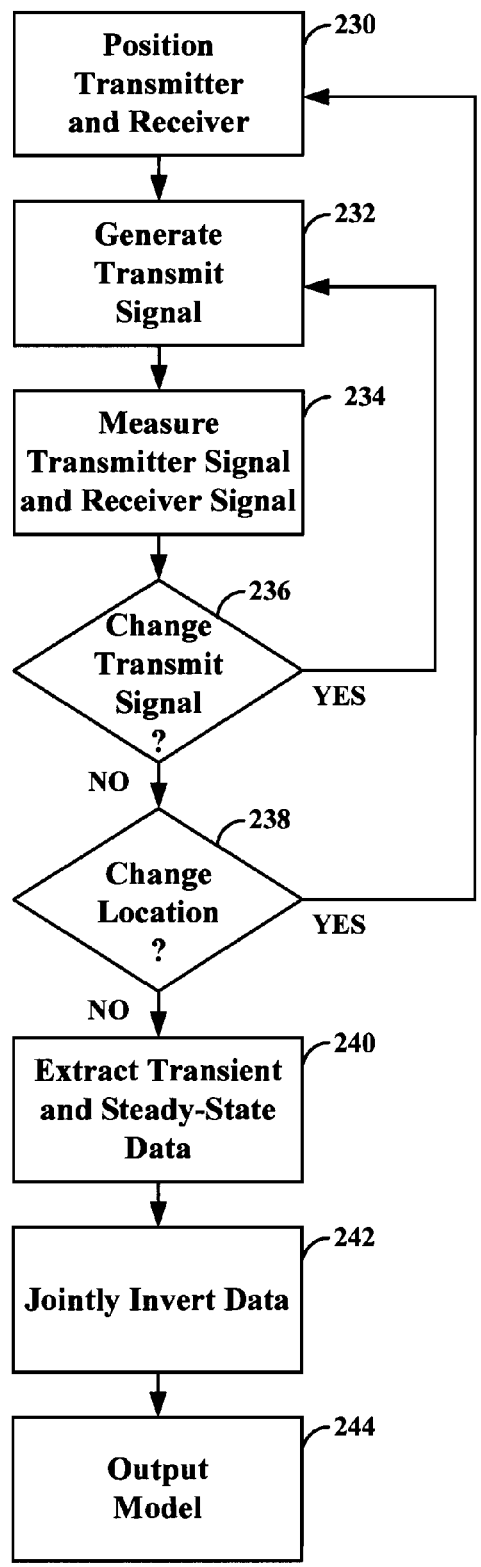
FIG. 16 is an exemplary controlled source electromagnetic surveying process using an exemplary system in accordance with this invention.

Referring now to FIGS. 6 and 16, an exemplary CSEM surveying process using CSEM system 50 is described. Beginning at step 230, one or more transmitters 56 and one or more receivers 58 are positioned for collecting subsurface geophysical data. For example, transmitters 56 and receivers 58 may be located on land or at or near the sea floor. In addition, transmitters 56 and receivers 58 may be located at stationary positions, or may be in movement (e.g., towed by a ship). The number of transmitters 56 and receivers 58 used, and the spacing and orientation of transmitters 56 and receivers 58 may be determined in accordance with any conventional geophysical surveying technique.

For example, a transmitter 56 may be positioned at a first predetermined location, and a receiver 58 may be located at a second predetermined location. The distance between the first predetermined location and the second predetermined location may be varied. In particular, the first predetermined location may be a fixed location, and the second predetermined location may be varied. Conversely, the first predetermined location may be varied, and the second predetermined location may be a fixed location. The first predetermined location may be at a first orientation, and the second predetermined location may be at a second orientation. The first and second orientations may be the same orientation or may be different orientations. For simplicity, the implementation of system 50 will be described using a single transmitter 56 and a single receiver 58. Persons of ordinary skill in the art will understand, however, that system 50 may also be used with multiple transmitters 56 and multiple receivers 58.

Transmitter 56 may include a source device 70 that is a grounded electric dipole antenna having a length between 1-10,000 meters, and receiver 58 may include a sensor 80 that is a grounded electric dipole antenna used to receive electromagnetic signals 36 that result when source device 70 transmits electromagnetic signals 34 into the earth.

At step 232, transmitter 56 transmits a first transmit signal 34 into the earth. For example, first transmit signal 34 may be a commutated bipolar square wave having a current between 1-100,000 amps. At step 234, transmitter electronics module 72 measures and records the first transmitted signal 34 for the first predetermined time interval, and receiver electronics module 82 measures and records the sensor output signal 84 for the second predetermined time interval. For example, the first and second predetermined time intervals may be seconds, minutes, hours or days, and may be substantially coincident (i.e., occurring at substantially the same time). Transmitter electronics module 72 and receiver electronics module 82 store the recorded data recorded transmit data 76 and receiver data 86.

Next, at step 236, a determination is made whether data samples should be collected using a second transmit signal 34. For example, it may be desirable to collect additional data samples using multiple transmit signals 34, each having a unique signal amplitude, wave shape, frequency or other parameter. If additional data samples are desired at a second transmit signal 34, the process returns to step 232, the second transmit signal 34 is generated, and data samples are collected for the first and second time intervals for the second transmit signal 34. This process may be repeated for additional transmit signals 34.

If no additional data samples at addition transmit signals 34 are desired, the process continues to step 238, where a determination is made whether data samples should be collected at another location. If such samples are desired, the process returns to step 230, and transmitter 56 and receiver 58 are positioned at a new location. The signal generation and data collection steps 232-236 are repeated. This process may be repeated for multiple locations.

If no new location data are desired, the process continues to step 240, wherein recorded transmit data 76 and receiver data 86 are retrieved from transmitter electronics module 72 and receiver electronics module 82, and transient and steady-state analysis module 92 process the retrieved data to generate transient component data 98 and steady-state component data 100.

Next, at step 242, joint inversion modeling module 96 processes transient component data 98 and steady-state component data 100 to generate a model of a subsurface geophysical structure, such as resistivity model 60. At step 244, the model data are provided as output. For example, model parameters may be displayed on a display device, or written to a data file in memory.

Person of ordinary skill in the art will understand that one or more of transmitter electronics module 72, receiver electronics module 82 and/or data processing module 54 may be implemented in hardware, software, firmware, or any combination thereof. Persons of ordinary skill in the art will also recognize that processes in accordance with this invention may be implemented in software including software instructions that may be provided via any applicable computer readable media or signal, such as, magnetically-read media, optically read media, solid state logic or memory, transmitted signal, or other similar media or signal.

The foregoing merely illustrates the principles of this invention, and various modifications can be made by persons of ordinary skill in the art without departing from the scope and spirit of this invention. Many variations, modifications, additions and improvements to the embodiments described above are possible. For example, data processing module 54 may include multiple processors, such as first, second and third processors. The first processor may be used to generate transient component data 98, the second processor may be used to generate steady-state component data 100, and the third processor may be used to jointly invert transient component data 98 and steady-state component data 100 to generate a model of a subsurface geophysical structure, such as resistivity model 60.

The invention claimed is:

1. A method for identifying a feature in a subsurface of earth, the method comprising:
   transmitting a time-varying electromagnetic signal at a first location;
   receiving an electromagnetic signal responsive to the transmitted signal at a second location, the received signal comprising a transient response component and a steady-state component;

continuously recording the received signal during a predetermined time interval;

extracting data corresponding to the transient response component from the received signal;

extracting data corresponding to the steady-state response component from the received signal; and jointly inverting the transient response data and the steady-state response data to identify the subsurface feature.

2. The method of claim 1, wherein the transmitted electromagnetic signal comprises an electric current.

3. The method of claim 1, wherein the transmitted electromagnetic signal comprises a magnetic field.

4. The method of claim 1, wherein the transmitted electromagnetic signal comprises a square wave.

5. The method of claim 1, wherein the transmitted electromagnetic signal comprises a commutated bipolar square wave.

6. The method of claim 1, wherein transmitting further comprises using a dipole antenna to transmit the electromagnetic signal.

7. The method of claim 6, wherein the dipole antenna comprises a grounded electric dipole antenna.

8. The method of claim 1, wherein transmitting further comprises using an inductive source to transmit the electromagnetic signal.

9. The method of claim 8, wherein the inductive source comprises a wire loop.

10. The method of claim 1, wherein transmitting further comprises using a dipole antenna and an inductive source.

11. The method of claim 1, wherein the received electromagnetic signal comprises a voltage.

12. The method of claim 1, wherein the received electromagnetic signal comprises a magnetic field.

13. The method of claim 1, wherein receiving further comprises using a dipole antenna to receive the electromagnetic signal.

14. The method of claim 13, wherein the dipole antenna comprises a grounded electric dipole antenna.

15. The method of claim 1, wherein receiving further comprises using an inductive source to receive the electromagnetic signal.

16. The method of claim 15, wherein the inductive source comprises a wire loop.

17. The method of claim 1, wherein receiving further comprises using a dipole antenna and an inductive source.

18. The method of claim 1, wherein the first location is on shore.

19. The method of claim 1, wherein the first location is under water.

20. The method of claim 1, wherein the second location is on shore.

21. The method of claim 1, wherein the second location is under water.

22. The method of claim 1, wherein the subsurface feature comprises a resistivity.

23. The method of claim 1, wherein the subsurface feature comprises a conductivity.

24. A system for identifying a feature in a subsurface of earth, the system comprising:

a transmitter for transmitting a time-varying electromagnetic signal at a first location;

a receiver for receiving an electromagnetic signal responsive to the transmitted signal at a second location, the received signal comprising a transient response component and a steady-state component;

a recorder for continuously recording the received signal during a predetermined time interval;

a first processor adapted to extract data corresponding to the transient response component from the received signal;

a second processor adapted to extract data corresponding to the steady-state response component from the received signal; and a third processor adapted to jointly invert the transient response data and the steady-state response data to identify the subsurface feature.

25. The system of claim 24, wherein the transmitted electromagnetic signal comprises an electric current.

26. The system of claim 24, wherein the transmitted electromagnetic signal comprises a magnetic field.

27. The system of claim 24, wherein the transmitted electromagnetic signal comprises a square wave.

28. The system of claim 24, wherein the transmitted electromagnetic signal comprises a commutated bipolar square wave.

29. The system of claim 24, wherein the transmitter comprises a dipole antenna.

30. The system of claim 29, wherein the dipole antenna comprises a grounded electric dipole antenna.

31. The system of claim 24, wherein the transmitter comprises an inductive source.

32. The system of claim 31, wherein the inductive source comprises a wire loop.

33. The system of claim 24, wherein the transmitter comprises a dipole antenna and an inductive source.

34. The system of claim 24, wherein the received electromagnetic signal comprises a voltage.

35. The system of claim 24, wherein the received electromagnetic signal comprises a magnetic field.

36. The system of claim 24, wherein the receiver comprises a dipole antenna.

37. The system of claim 36, wherein the dipole antenna comprises a grounded electric dipole antenna.

38. The system of claim 24, wherein the receiver comprises an inductive source.

39. The system of claim 38, wherein the inductive source comprises a wire loop.

40. The system of claim 24, wherein the receiver comprises a dipole antenna and an inductive source.

41. The system of claim 24, wherein the first location is on shore.

42. The system of claim 24, wherein the first location is under water.

43. The system of claim 24, wherein the second location is on shore.

44. The system of claim 24, wherein the second location is under water.

45. The system of claim 24, wherein the subsurface feature comprises a resistivity.

46. The system of claim 24, wherein the subsurface feature comprises a conductivity.

* * * * *